United States Patent [19]

Cramer, Jr.

[11] 3,865,909
[45] Feb. 11, 1975

[54] FLOATATION AERATOR FOR AERATING AND MOVING WATER

[76] Inventor: Roy A. Cramer, Jr., 8100 Paseo, Kansas City, Mo. 64131

[22] Filed: May 7, 1973

[21] Appl. No.: 358,085

[52] U.S. Cl. .................. 261/91, 210/219, 261/120
[51] Int. Cl. ................................................ B01f 3/04
[58] Field of Search ............... 261/120, 91; 210/219

[56] References Cited
UNITED STATES PATENTS

| | | | |
|---|---|---|---|
| 2,554,868 | 5/1951 | Mills | 261/91 X |
| 3,300,047 | 1/1967 | Hirsch | 210/219 X |
| 3,367,079 | 2/1968 | MacLaren | 210/219 X |
| 3,496,901 | 2/1970 | Stanfield et al. | 261/120 X |
| 3,497,185 | 2/1970 | Dively | 261/120 X |
| 3,524,629 | 8/1970 | Culwell | 261/91 X |
| 3,640,514 | 2/1972 | Albritton | 261/120 X |

Primary Examiner—Frank W. Lutter
Assistant Examiner—William Cuchlinski, Jr.
Attorney, Agent, or Firm—Fishburn, Gold & Litman

[57] ABSTRACT

A water moving apparatus which also aerates water including a float member floating on a body of water and tethered in a selected position. A submersible motor is supported by the float member and suspended therefrom in the body of water and has a propeller operable to propel water upwardly through an opening in the float member. A diffusing or dispersing member is mounted above water level on the float coaxial with the propeller and opening whereby operation of the motor and propeller directs water against the diffuser to effect an upwardly and outwardly discharge of water resulting in aeration of the water.

6 Claims, 5 Drawing Figures

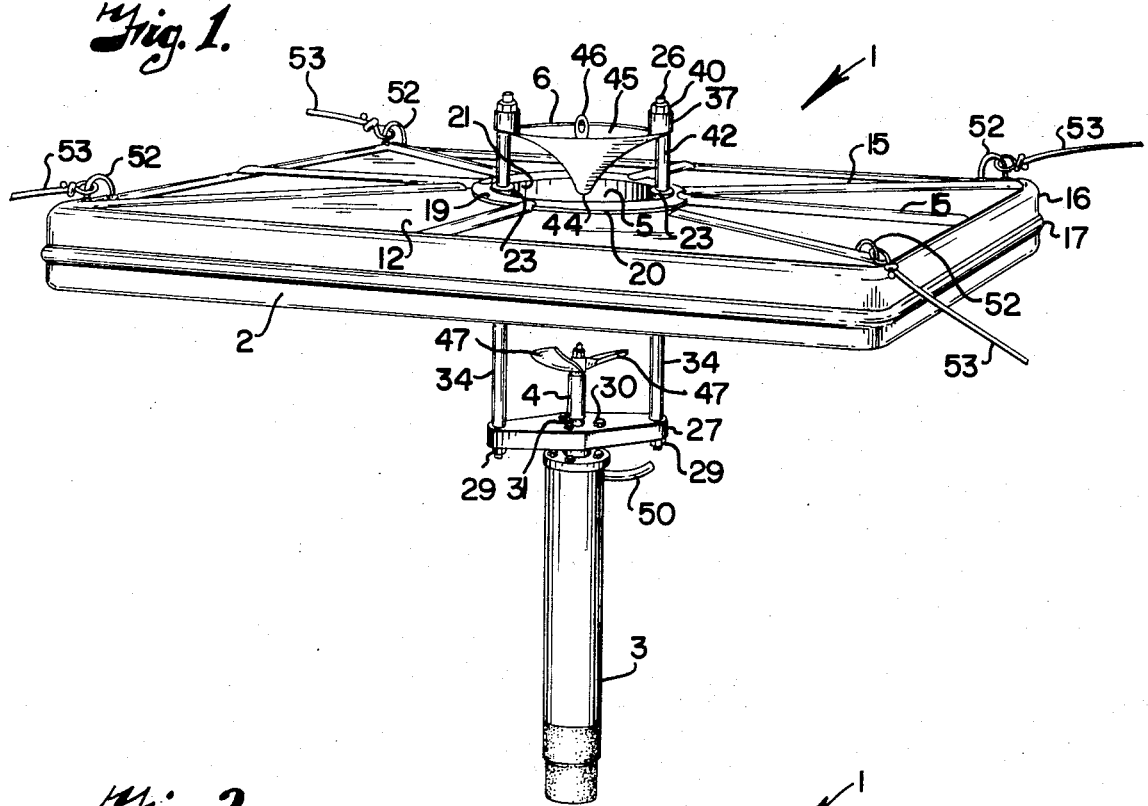
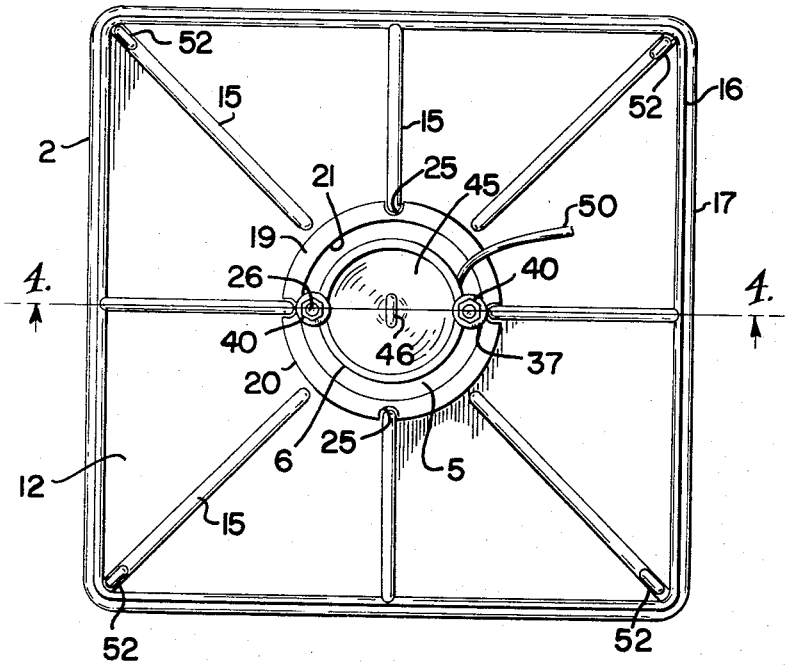

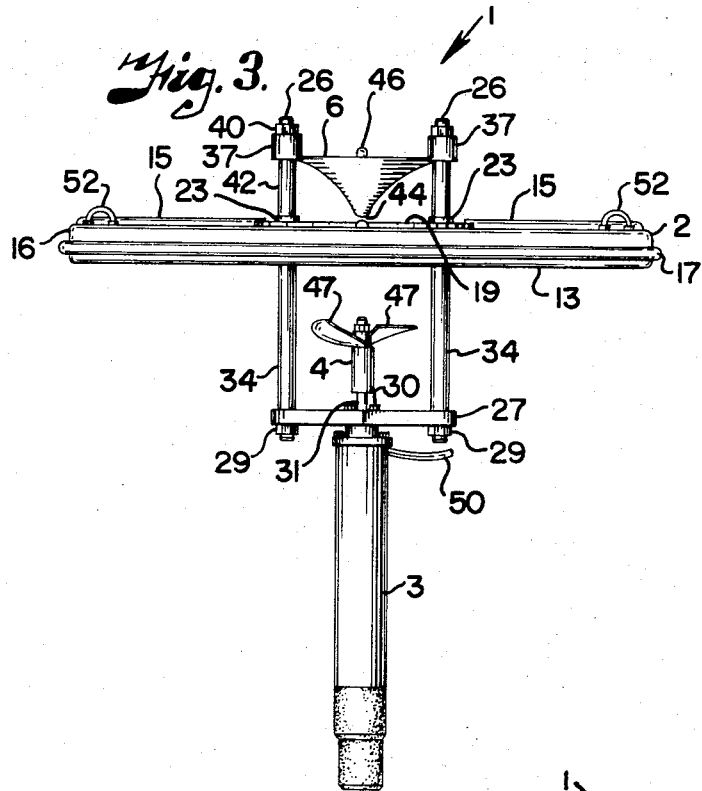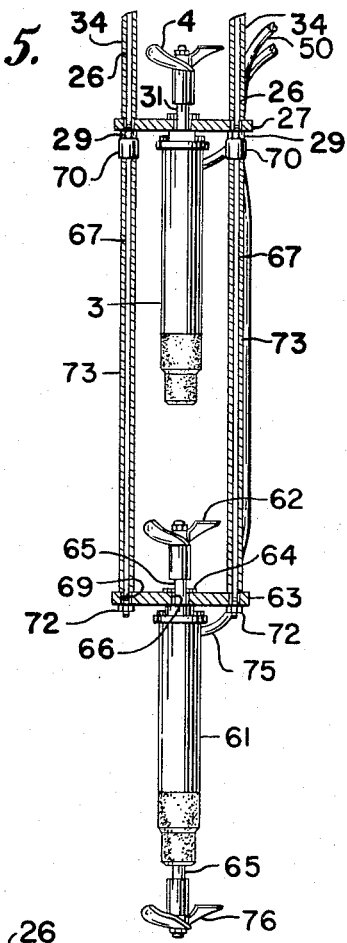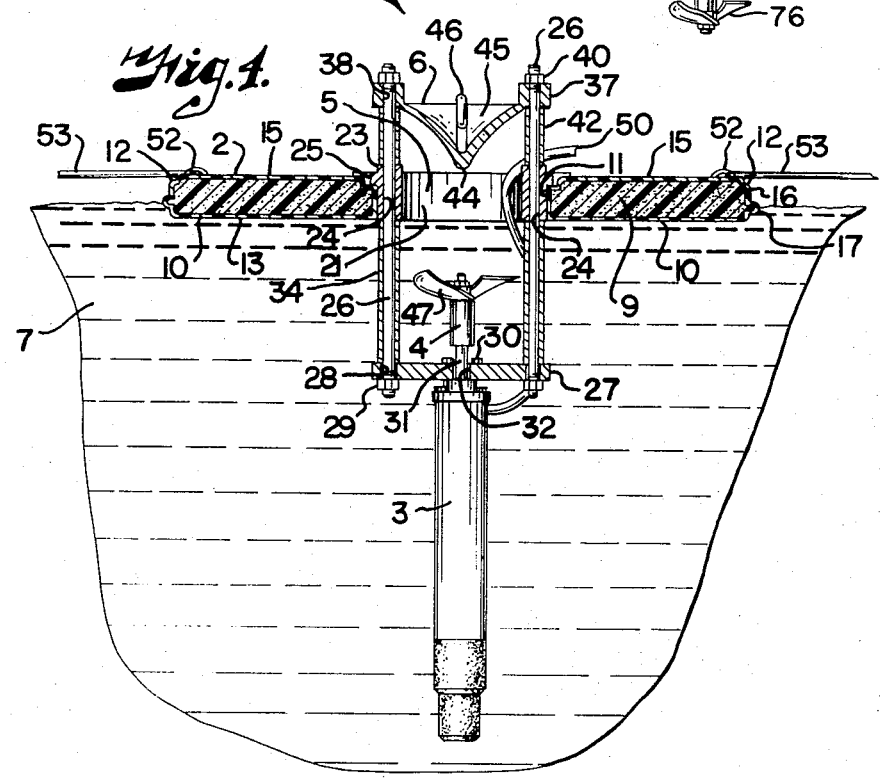

FLOATATION AERATOR FOR AERATING AND MOVING WATER

The present invention relates to a floating water moving apparatus operative to move water in a body of water and spray same into the atmosphere for increasing the oxygen content of the water.

Floation aeration apparatus heretofore used has had motors mounted on floats with shafts extending downwardly into the water and a propeller thereon to propel water upwardly into the air above the body of water. Such structures have presented difficulties due to bearing failure and burning out of motors in cold weather when the water freezes into an ice covering of the motors. Also, the ice forms in non-uniform relation weighting one side tipping the structure and emersing the motors which are ruined by emersion requiring expensive renovation.

The principal objects of the present invention are: to provide a support for a water dispersion apparatus operative in selected locations in a body of water to aerate same; to provide such water moving apparatus which overcomes the aforementioned difficulties; to provide such a water moving apparatus that floats on a body of water and that is operative to spray water from a body of water into the air for aeration thereof; to provide such a water moving apparatus adapted to effect an upwardly and outwardly discharge of water to cover a large area with water spray; to provide such a water moving apparatus adapted for use in pollution areas such as sewage treatment lagoons to promote organisms within the body of water by aeration thereof; to provide such a water moving apparatus with a float member that is bacteria resistant and that has suitable anchors or tether members to allow the apparatus to float on the surface of the body of water so that it is easily moved to selected positions; to provide such a water moving apparatus that does not increase the turbidity of the body of water; to provide such a water moving apparatus that will help prevent growth of algae by the movement and aeration of the water and that will help bacteria to propagate; to provide such a water moving apparatus wherein the motor and propeller are suspended below the surface of the body of water providing a low center of gravity; and to provide such a water moving apparatus that is suited for its intended use, inexpensive to manufacture and simple to install and maintain.

Other objects and advantages of the present invention will become apparent from the following detailed description taken in connection with the accompanying drawings wherein are set forth by way of illustration and example, certain embodiments of this invention.

FIG. 1 is a perspective view of a water moving apparatus.

FIG. 2 is a plan view of a water moving apparatus.

FIG. 3 is a side elevation view of the water moving apparatus.

FIG. 4 is a section view of the water moving apparatus taken along the line 4—4.

FIG. 5 is a fragmentary elevation view of the water moving apparatus illustrating a variation in water propelling means.

As required, detailed embodiments of the present invention are disclosed herein. However, it is to be understood that the disclosed embodiments are merely exemplary of the invention which may be embodied in various forms. Therefore, specific structural and functional details disclosed herein are not to interpreted as limited but merely as a basis for the claims and as a representative basis for teaching one skilled in the art to variously employ the present invention in virtually any appropriate detailed structure.

Referring more in detail to the drawings:

The reference numeral 1 designates generally the water moving apparatus for aeration in a body of water such as fish ponds, lagoons, water plants, etc. The water moving apparatus 1 is operative to move subsurface water upwardly and outwardly of the surface of the body of water 7 in dispersed droplets to aerate the water. The water moving apparatus 1 includes a float member 2 having a motor 3 supported thereby operative to rotate a propeller 4 to move sub-surface water upwardly through an opening 5 toward a flow diffusing or dispersing member 6. The upward flow of water impinges on the diffusing member 6 which disperses the water upwardly and outwardly through the air thereby distributing the water over a wide area.

In the illustrated structure, the float member 2 has substantial area and supports the structure with little change in depth of displacement in response to change of weight thereon as by ice formation thereon. The float member 2, as illustrated, is rectangular in shape, although rectangular, round or other shapes may be used. The float member 2 is preferably of a structure that is non-corrosive, long life, and non-sinkable. The float shown is formed of synthetic resin and has an inner foam portion or body 9 that has a protective coating 10 enclosing same. The foam interior 9 is of a low density plastic foam, such as Styrofoam and the outer coating 10 is preferably a semi-rigid plastic coating applied to the outer surface of the body 9 such as by dipping the Styrofoam therein. The coating or sheath 10 covers the entire surface of the foam body 9 and is a shell filled with a low density material or foam of high floatation qualities. The outer plastic coating 10 helps prevent physical damage to the foam interior or body 9, helps reduce deterioration from constant exposure to the elements and makes the float member 2 bacteria resistant. An opening or aperture 11 extends through the float member 2 between opposed relatively flat surfaces 12 and 13 and preferably is centrally located in the float member 2. The float member 2 includes rib members 15 on the upper surface 12 that extend radially outwardly from the opening 11 toward the peripheral edge 16 of the float member 2. A rib 17 protrudes from the peripheral edge 16 and extends around the float member 2. The ribs 15 and 17 and the skin or coating thereon of solid plastic increases rigidity and gives added strength to the float member 2.

The opening 11 is encased and protected by a ring member 19 which also serves to provide a mounting of the motor on the float member 2. The ring member or mounting member 19, preferably is annular in form, and located in the opening 11 and is preferably made of a corrosion and rust resistant material such as aluminum or brass. The ring member 19 has a flange portion 20 extending outwardly therefrom adjacent the upper end thereof and engages the upper surface 12 of the float member 2 around the opening 11. The flange 20 rests on the float and has an area to provide adequate support for the motor.

The mounting member or ring member 19, as illustrated, has an inside surface 21 defining the opening 5 that extends axially therethrough. The motor is suitably supported from the ring member 19 in suspended relation thereto. In the illustrated structure there are a plurality of support rods 26 connecting the ring member 19 and the motor mount. In the structure illustrated, the member 19 has a plurality of circumferentially spaced bosses 23 that preferably are integral with the ring member 19. Each boss 23 has an elongate bore 24 extending therethrough generally parallel to the axis of the opening 5 to receive support, as later described. In the illustrated structure, the flange 20 has a plurality of notches 25 therethrough spaced circumferentially therearound, each receiving therein a respective rib 15 to prevent relative rotation between the mounting member 19 and the float member 2.

The motor 3 and propeller 4 are positioned in axially aligned and spaced relation with the diffuser 6 and are suitably mounted on the float member 2 wherein the motor 3 and propeller 4 are suspended beneath the float member 2. In the illustrated structure, tie-rod members 26 extend through the elongate bores 24 wherein each tie-rod member 26 extends above and below the ring member 19. A bracket 27 has openings 28 therethrough adjacent opposite ends with each opening 28 receiving a tie-rod member 26 therethrough with each tie-rod member 26 having the bracket 27 suitably mounted thereon such as by nuts 29 in threaded engagement with the lower end of each of the tie-rods 26. The motor 3 is secured to the bracket 27 as by bolts 30 wherein a shaft 31 of the motor 3 extends through an aperture 32 of the bracket 27 having sufficient clearance therebetween to permit free rotation of the shaft 31. It is desirable to have the motor 3 mounted on the float member 2 in such a manner as to have the depth of the propeller 4 adjustable in relation to the surface of the body of water 7. As illustrated, sleeve members 34 are on the tie-rod members 26 to space the motor 3 in a selected position below the mounting member 19 wherein a pair of different length sleeves 34 can be used to change the depth of the propeller 4.

The diffusing member 6 has bosses 37 preferably integral therewith adjacent the upper surface and on opposite sides thereof. Each boss 37 has a through aperture 38 through which a respective tie-rod member 26 extends. The diffuser 6 is suitably mounted on the tie-rods 26 as by having sleeve members 42 on the respective tie-rod 26 and at selective spacing above the float member 2 the upper end of each of the tie-rods 26 is threaded. The diffuser 6 has bores receiving the tie-rods so the diffuser 6 rests on the sleeve members 42 and is secured by nuts 40 threaded on the upper ends of the tie-rods 26. The spacing of the diffuser 6 from the float member 2 may be changed by changing the lengths of the sleeves 42. Tightening of the nuts 29 and 40 holds the diffuser 6, sleeves 42 and 34 and the mounting bracket 27 and motor mounting member 19, mounting bracket 27 and motor 3 in secure engagement. The nuts 40 and 29, the tie-rods 26, sleeves 42 and 34 and mounting bracket 27, the diffuser 6, the propeller 4 and the motor 3 are made of a material that is rust and corrosion resistant such as brass, aluminum, stainless steel and the like.

The diffuser 6 has an outer surface curved upwardly and outwardly and is preferably generally cone-shaped having a point 44 pointing downwardly toward the propeller 4. The diffuser 6 has an upwardly opening chamber 45 with a lifting device 46 such as an eye-bolt suitably secured therein operative for being attached to a lifting device such as a crane for removing or mounting the motor 3 and the diffuser 6 on the float member 2.

The propeller 4 is suitably secured to the shaft 31 of the motor 3 whereby energization of the motor 3 effects rotatation of the propeller 4. As illustrated, the propeller 4 has a pair of opposed arcuate curved blades 47 each having a pitch and configuration to effect upwardly directed discharge of water toward the diffuser 6. The flow of water induced by the propeller 4 is directed upwardly against the diffuser 6 where it is dispersed upwardly and outwardly by the side of the diffusing member 6.

The motor 3 is operative to rotate the shaft 31 which extends upwardly from the motor 3 and is co-axial with the cone-shaped diffusing member 6 and aligned with the point thereof. The motor 3 is a submersible high speed electric motor and is operative to rotate the propeller 4 mounted thereon at a speed in the nature of 3,000 to 3,500 rpm. The motor 3 may be of different lengths and sizes to provide different power outputs.

A waterproof electrical conduit 50 having a suitable electrical conductor therein electrically connects the motor 3 to a source of electrical power (not shown) to complete a circuit which when energized will start and run the motor 3 and thereby rotate the shaft 31 and the propeller 4 thereon. In the illustrated structure, the conduit 50 extends upwardly through the opening 5 and is positioned away from the propeller 4 to prevent cutting thereby and may be secured to the tie-rod members 26 or sleeves 34 to prevent contact with the propeller 4.

The float member 2 is provided with tether means to prevent same from moving in the body of water and to help prevent the water moving apparatus 1 from rotating due to torque induced by the rotation of the propeller 4. In the illustrated structure, eye members 52 are suitably secured to the float member 2 adjacent each corner thereof and have a flexible cable 53 suitably secured thereto. Each of the cables 53 extend from the float member 2 having the other end thereof secured to anchor means such as rods (not shown) driven into the shore of the body of water and with the cable members 53 tensioned, the water moving apparatus 1 will be held in a selected position.

In operating, a water moving apparatus 1 is placed in a suitable body of water having a depth sufficient to accommodate the motor 3 suspended from the float member 2, the water moving apparatus 1 being secured in a selected position by the cables 53. With the propeller 4 set at the desired depth, the motor 3 is energized thereby causing rotation of the propeller 4. The propeller 4 directs water flow upwardly through the opening 5 and against the exposed surfaces of the diffuser 6 whereby the water is dispersed outwardly in droplets through the air to absorb oxygen therefrom before returning to the body of water 7. The area caused by the water spray can be adjusted by varying the distance between the diffusing member 6 and the surface of the body of water 7 as described above. The axially aligned relation between the propeller 3 and the diffuser 6 provide a substantially uniform distribution of water spray around the float member 2. By having the motor submerged in the body of water 7, a low center of gravity for the water moving apparatus is provided preventing it from turning over and also preventing ice build-up on the structure from causing premature failure thereof due to overheating.

FIG. 5 illustrates a variation of motor and propeller arrangement wherein a second motor 61 is arranged relative to the motor 3 and drives a propeller 62 to help improve water movement. As illustrated the motor 61 is suspended beneath the motor 3 and preferably moves water upwardly around the motor 3 to the propeller 4.

In the illustrated structure the motor 61 is in tandem with the motor 3 and is suspended therebeneath by suitable means. In the example illustrated the motor 61 is mounted on a bracket 63 as with bolts 64 wherein a shaft 65 of the motor 61 extends through an opening 66 of the bracket 63 having sufficient clearance therebetween to permit free rotation of the shaft 65. The motor 61 and bracket 63 are mounted beneath the bracket 27 and the motor 3 and as illustrated, tie rods 67 connect the bracket 63 to the bracket 27. The bracket 63 is provided with apertures 69 on opposite sides of the motor 61 receiving therethrough the tie rods 67. The tie rods 67 may be secured to the bracket 27 in any suitable manner to depend therefrom and in the form illustrated couplers 70 are secured to the lower ends of the tie rods 26 such as by threaded engagement and have the tie rods 67 secured thereto and depending therefrom. Preferably the tie rods 67 have both ends thereof threaded wherein the upper threaded ends are in threaded engagement with the couplers 70 and the lower ends extend through the apertures 69 and have nuts 72 in threaded engagement therewith securing the bracket 63 to the tie rods 67.

In the illustrated structure, sleeves or spacers 73 surround the tie rods 67 and are in engagement with the bracket 63 and the couplers 70 thereby determining the spacing between the brackets 27 and 63. It is to be noted that the sleeves 73 may be of different lengths to provide different spacings between the brackets 27 and 63 and thereby determine the depth of the motor 61 in the water.

The motor 61 is operative to rotate the shaft 65 which extends upwardly from the motor 61 and is preferably coaxially with the cone shape diffusing member 6, the shaft 31 and the propeller 4 and is aligned with the point of the cone shaped diffusing member 6. The motor 61 is a submersible high speed electric motor and is operative to rotate the propeller 62 which is illustrated as mounted on the shaft 65, at a speed in the nature of 3,000 to 3,500 rpm. The motor 61 may be of different lengths and sizes to provide different power outputs.

A waterproof electrical conduit 75, having a suitable electrical conductor therein, electrically connects the motor 61 to a source of electrical power (not shown) to complete a circuit which when energized will start and run the motor 61 and thereby rotate the shaft 65 and the propeller 62. In the illustrated structure the conduit 75 extends upwardly through the opening 5 and is positioned away from the propellers 62 and 4 to prevent cutting thereby and may be secured to the tie rods 67 and 26 or the sleeves 73 and 34 to prevent contact with the propellers 4 and 62.

It is noted that the motor 61 may be a double end shaft motor whereby the shaft 65 also extends out of the bottom end of the motor 61. In the form illustrated, a second propeller 76 is mounted on the other end of the shaft 65 and is rotated thereby. The propellers 62 and 76 when rotated by the motor 61 provide movement of the water at depths deeper than the propeller 4 can obtain. The use of the propellers 62 and 76 should increase the capacity of the water moving apparatus 1, improve mixing of the water and move water upwardly from deeper depths.

It is to be further noted that the motor 3 can also be a double end shaft motor similar to the motor 61 and can be operated as a double end shaft motor with two propellers with or without the use of the motor 61. Both the motor 3, motor 61 and the diffuser 6 are adjustable in relation to the surface of the water 7 for controlling the amount of water moved, the depth from which it is moved and the area over which the diffused water is sprayed. As described above, adjustment is provided by changing the lengths of the sleeves 34, 73 and 42 and if necessary the lengths of the tie rods 26 and 67.

Operation to the form shown in FIG. 5 is similar to the operation of the form shown in FIGS. 1 – 4 inclusive.

It is to be understood that while I have illustrated and described certain forms of my invention, it is not to be limited to the specific forms or arrangements of parts herein described and shown.

What I claim and desire to secure by Letters Patent is:

1. A water aeration apparatus for aerating a body of water by propelling a stream of water from said body upwardly and outwardly above the surface of said body comprising:
   a. a float member of substantial area to float on a body of water and serve as a support, said float member having therethrough a central opening with a vertical axis;
   b. a ring member positioned in and encasing said central opening and defining a vertical water flow passage through said float member, said ring member having laterally outward extending portions resting in supporting engagement with the float member to retain the ring member relative thereto;
   c. motor support members spaced on said ring member and depending therefrom;
   d. a submersible motor carried by said motor support members and spaced below said float member, said motor having a power shaft substantially axially aligned with said flow passage;
   e. a propeller mounted on said power shaft between the motor and float member and spaced below the float member and ring member, the area under the float member and surrounding the propeller and motor having only the spaced motor support members therein for substantially unobstructed movement of water from below the float member to said propeller, said propeller being driven by said motor to propel a stream of water upwardly through said water passage;
   f. a diffuser of generally inverted cone shape supported on said ring member above the float member and substantially axially aligned with said water passage, said diffuser having upwardly and outwardly curved surfaces for impingement of the stream of water and to disperse said water upwardly and outwardly over a wide area.

2. A water aerating apparatus as set forth in claim 1 wherein:
   a. said float member having a plastic shell defining a sealed hollow chamber, said chamber being filled with a foam material whereby said plastic shell prevents water from contacting said foam.

3. A water aerating apparatus as set forth in claim 2 including:
   a. ribs protruding from an upper disposed surface of said float member and extending outwardly from said opening; and
   b. means associated with said ring member and cooperating with said ribs for holding said motor and said ring member from rotation relative to said float member.

4. A water aeration apparatus for aerating a body of water by propelling a stream of water from said body upwardly and outwardly above the surface of said body comprising:
   a. a float member of substantial area to float on a body of water and serve as a support, said float member having therethrough a central opening with a vertical axis, said float member having a plastic shell defining a sealed hollow chamber, said chamber being filled with a foam material whereby said plastic shell prevents water from contacting said foam;
   b. a ring member positioned in said central opening and defining a vertical water flow passage through said float member, said ring member having laterally outward extending portions engaging the float member to retain the ring member relative thereto, the laterally outwardly extending portions on the ring member being a top flange resting in supporting engagement with the float member around said central opening;
   c. motor support members spaced on said ring member and depending therefrom;
   d. a submersible motor carried by said motor support members and spaced below said float member, said motor having a power shaft substantially axially aligned with said flow passage;
   e. a propeller mounted on said power shaft between the motor and float member and spaced below the float member and ring member for substantially unobstructed movement of water from below the float member to said propeller, said propeller being driven by said motor to propel a stream of water upwardly through said water passage;
   f. a diffuser of generally inverted cone shape supported on said ring member above the float member and substantially axially aligned with said water passage, said diffuser having upwardly and outwardly curved surfaces for impingement of the stream of water and to disperse said water upwardly and outwardly over a wide area;
   g. ribs protruding from an upper disposed surface of said float member and extending outwardly from said opening;
   h. means associated with said ring member and cooperating with said ribs for holding said motor and said ring member from rotation relative to said float member;
   i. the means cooperating with the ribs on the float member are notches in said flange;
   j. the motor support members depending from the ring member include tie-rods secured to the motor and ring member and sleeves on said rods, said tie-rods and sleeves being adjustable for selective spacing of the motor and propeller below the float member.

5. A water aerating apparatus as set forth in claim 4 including:
   a. a second submersible motor having a power shaft axially of and spaced below the first named submersible motor;
   b. said motor support members including the rod extensions and sleeves secured relative to the first named submersible motor and extending therebelow and secured to said second submersible motor to support same from said ring member;
   c. a second propeller mounted on the power shaft of said second submersible motor and operative to move water in said body of water upwardly around and past said first named submersible motor.

6. A water aeration apparatus comprising:
   a. a float member of substantial area to float on a body of water in a selected position, said float member having a central opening extending therethrough;
   b. mounting means supported by the float member at said opening and having portions extending therefrom downwardly in the body of water;
   c. a submersible motor carried by said mounting means portions in downwardly spaced relation to said float member;
   d. a propeller driven by said submersible motor and positioned below the float member and substantially axially aligned with said central opening to propel water upwardly through said opening;
   e. a diffuser supported on the float member above and in axial alignment with said opening for impingement of water propelled by said propeller;
   f. said diffuser having an upwardly and outwardly curved surface to disperse said water upwardly and outwardly over a wide area;
   g. means anchoring said float in a selected position on the body of water, said anchor means includes a plurality of secured cable members each having one end connected to the float member in a tensioned condition;
   h. means associated with said motor for adjusting the depth of said propeller in the body of water;
   i. means mounting said motor on said float member and preventing relative rotation therebetween;
   j. said motor having a shaft extending upwardly therefrom and having said propeller mounted thereon between the motor and float member;
   k. said float member having an outer plastic shell filled with foam material, said plastic shell sealing said foam preventing contact with water, said float member having ribs protruding from an upper disposed surface and extending outwardly from said opening;
   l. said mounting means includes a ring member with a flange extending radially outwardly from one end thereof, said ring being received in said opening and having said flange in supporting engagement with said upper surface, said flange having at least one notch therein receiving a respective rib for preventing rotation between said ring and said float member;
   m. tie-rods mounted on said ring member with ends extending upwardly and downwardly therefrom, said motor being secured to the lower ends and said diffuser being secured to the upper ends; and
   n. sleeve members mounted on each end of the tie-rods having same extend therethrough with the sleeves on the upper ends of the tie-rods being between the diffuser and the ring and with the sleeves on the lower ends of the tie-rods being between the motor and the ring whereby the depth of the propeller is adjustable by the use of different length sleeves on the lower ends of the tie-rods.

* * * * *